United States Patent [19]

Lester

[11] 3,969,270

[45] July 13, 1976

[54] METHOD OF CATALYST MANUFACTURE

[75] Inventor: George R. Lester, Park Ridge, Ill.

[73] Assignee: Universal Oil Products Company, Des Plaines, Ill.

[22] Filed: Dec. 16, 1974

[21] Appl. No.: 533,093

[52] U.S. Cl. .......................... 252/430; 252/431 C; 252/466 PT; 252/466 B; 252/473
[51] Int. Cl.² .................... B01J 31/02; B01J 31/12
[58] Field of Search ............ 252/430, 431 C, 466 B, 252/466 PT

[56] References Cited
UNITED STATES PATENTS

| | | | |
|---|---|---|---|
| 3,367,888 | 2/1968 | Hoekstra | 242/466 B |
| 3,409,390 | 11/1968 | Hoekstra | 252/466 B |

OTHER PUBLICATIONS

Hackh's Chemical Dictionary–4th Ed. McGraw–Hill (1969) pp. 78–79 and 528–529.

Primary Examiner—Helen M. McCarthy
Attorney, Agent, or Firm—James R. Hoatson, Jr; Robert W. Welch; William H. Page II

[57] ABSTRACT

A method of impregnating a catalytic component on a carrier material. The carrier material is immersed in an impregnating solution containing a catalytic component and a polybasic carboxylic acid, with a sulfur-containing carboxylic acid being subsequently added to the solution whereby the catalytic component is dispersed in a subsurface layer on the carrier material and penetration beyond the desired subsurface layer is substantially obviated. Prior to calcining, the impregnated carrier material is further impregnated with an alkaline earth metal salt of an organic acid, and the solution evaporated to dryness in contact with the impregnated carrier material.

13 Claims, No Drawings

METHOD OF CATALYST MANUFACTURE

Gaseous waste products resulting from the burning or combustion of hydrocarbonaceous fuels, such as gasoline and fuel oils, comprise hydrocarbons, carbon monoxide and oxides of nitrogens as products of combustion or incomplete combustion and, when discharged directly to the atmosphere, pose a serious health problem. While exhaust gases from other hydrocarbonaceous fuel burning sources such as stationary engines, industrial furnaces, and the like, contribute substantially to air pollution, the exhaust gases of automobile engines are a principal source of pollution. In recent years, with the ever growing number of automobiles powered by internal combustion engines, the discharge of waste products to the atmosphere has been of increasing concern, particularly in urban areas, and the control thereof has become exceedingly important. Of the various methods which have been proposed, the incorporation of a catalytic converter in the exhaust system holds the most promise of meeting the increasingly rigid standards set by responsible governmental agencies.

It has heretofore been shown that a catalytically active component embedded as a subsurface layer on a support or carrier material provides a particularly useful catalyst for the conversion of hydrocarbons, carbon monoxide and nitrogen oxide contained in hot exhaust gases emanating from an internal combustion engine. For example, see U.S. Pat. No. 3,259,454 which provides a method of impregnating a catalytic component on a carrier material as a subsurface layer a finite distance from the exterior surface and a finite distance from the center thereof. Briefly, the method comprises commingling a polybasic carboxylic acid, such as citric acid, with a catalytic component in an impregnating solution whereby said component is deposited as a subsurface layer on a carrier material subsequently impregnated with said solution. In addition to the improved conversion of noxious components of exhaust gases, deposition of the catalyst component on the carrier material as a subsurface layer substantially obviates poisoning of said component and the loss thereof which typically occurs by reason of the abrasion and attrition of surface-impregnated catalyst particles.

Subsequent experience has shown that while substantially all of the catalytic component is embedded as a subsurface layer a finite distance from the exterior surface and a finite distance from the center of the carrier material, a significant amount of the frequently expensive catalytic component will invariably penetrate beyond the desired subsurface layer out of effective contact with a reactant stream.

It is therefore one object of this invention to present a novel method of impregnating a catalytic component as a subsurface layer on a refractory inorganic oxide carrier material, which method precludes the penetration of said catalytic component beyond said subsurface layer.

In one of its broad aspects, the present invention embodies a method of manufacturing a catalytic composite which comprises commingling a refractory inorganic oxide carrier material in an impregnating solution with a Group VIII metal compound and from about 0.05 to about 0.75 wt. % polybasic carboxylic acid; maintaining said carrier material in said solution for a period of from about 2 to about 10 minutes, and then commingling sufficient sulfur-containing carboxylic acid with said solution to provide from about 1 to about 3 moles of said acid per mole of said Group VIII metal, and effecting the deposition of said Group VIII metal compound concentrated in a thin subsurface layer on the carrier material; prior to calcining the impregnated carrier material, further impregnating the same with a solution of an alkaline earth metal salt of an organic acid selected from the group consisting of the calcium, strontium and barium salts thereof, and evaporating said solution to dryness in contact with the impregnated carrier material; and thereafter calcining the impregnated carrier material.

Other objects and embodiments of this invention will become apparent in the following detailed specification.

In accordance with the method of this invention, a refractory inorganic oxide support or carrier material is initially commingled in an impregnating solution with a Group VIII metal compound and a polybasic carboxylic acid. The refractory inorganic oxides may be naturally occurring materials, for example clays and silicates such as fuller's earth, Attapulgus clay, feldspar, halloysite, montmorillonite, kaolin, and diatomaceous earth, frequently referred to as siliceous earth, diatomaceous silicate, kieselguhr, and the like, and the naturally occurring materials may or may not be activated prior to use by one or more treatments including drying, calcining, steaming and/or acid treatment. Synthetically prepared refractory inorganic oxides like alumina, silica, zirconia, boria, thoria, magnesia, titania, chromia, etc., or composites thereof, particularly alumina in combination with one or more refractory inorganic oxides, for example, alumina-silica, alumina-zirconia, alumina-chromia, and the like are especially suitable. In some cases, the refractory inorganic oxide support or carrier material may also exhibit a catalytic effect alone or in combination with other components of the catalytic composite. Alumina is a preferred refractory inorganic oxide, and the alumina may be any of the various hydrous aluminium oxides or alumina gels including alpha-alumina monohydrate (boehmite), alpha-alumina trihydrate (gibbsite), beta-alumina trihydrate (bayerite), and the like. Activated aluminas, such as have been thermally treated to eliminate substantially all of the water and/or hydroxyl groups commonly associated therewith, are particularly useful. Preferably, the alumina is an activated alumina with a surface area of from about 100 to about 500 square meters per gram, especially gamma-alumina and eta-alumina resulting from the thermal treatment of boehmite alumina and bayerite alumina respectively, generally at a temperature of from about 400° to about 850° C. The alumina may be employed in any suitable shape or from including spheres, pills, extrudates, granules, cakes, briquettes, rings, etc., and particularly low density spheres such as are continuously manufactured by the oil drop method described in detail in U.S. Pat. No. 2,620,314.

As heretofore stated, the refractory inorganic oxide support or carrier material is commingled with an impregnating solution of a Group VIII metal compound and a polybasic carboxylic acid -- the polybasic carboxylic acid effecting impregnation of the Group VIII metal compound on the support or carrier material as a subsurface layer a finite distance from the surface thereof and a finite distance from the center. Suitable Group VIII metal compounds, that is, compounds of iron, nickel, cobalt, platinum, palladium, ruthenium, rhodium, osmium and iridium, include nickel nitrate, nickel sulfate, nickel chloride, nickel acetate, nickel formate, cobaltous nitrate, cobaltous sulfate, ferric chloride, ferric nitrate, ferric sulfate, chloroplatinic acid, platinum tetrachloride, ammonium chloroplatinate, dinitrodiamino platinum, palladium chloride, chloropalladic acid, rhodium trichloride, ruthenium tetrachloride, osmium trichloride, iridium trichloride, and the like.

Of the Group VIII metals, the noble or platinum group metals are preferred. While platinum per se has long been known to catalyze the oxidation of noxious exhaust gases to effect substantially complete conversion of the combustible pollutants contained therein, it has now been found that the required amount of the relatively expensive platinum can be substantially reduced utilizing a palladium promoter, and it has been further found that substantially less total noble metals, palladium and platinum, is required to obtain substantially complete conversion than is the case with platinum alone. The total noble metals concentration and the palladium/platinum weight ratio for a given concentration are factors which exert a strong influence on the activity stability of the catalytic composite of this invention. The activity stability of a catalytic composite containing from about 0.0025 to about 2.0 wt. % or more total noble metals is improved utilizing a palladium/platinum weight ratio in the range of from about 9:1 to about 1:4. In any case, the total noble metals in the range of from about 0.0025 to about 2.0 wt. % or more, utilizing a palladium/platinum weight ratio of from about 9:1 to about 1:4, is appreciably less than would otherwise be required of platinum alone to achieve an equivalent conversion. A total noble metals concentration in the lower range, say from about 0.0025 to about 1.0 wt. % is particularly effective in combination with a palladium/platinum weight ratio of from about 2:1 to about 4:1.

Prior associated work, as exemplified by U.S. Pat. No. 3,259,589, has shown the improved conversion of exhaust gases through the use of an impregnating agent to position the Group VIII metal component a finite distance below the surface of the carrier material. The impregnating agent is a polybasic carboxylic acid, preferably a dibasic carboxylic acid such as oxalic, malonic, succinic, glutaric, adipic, pimelic, suberic, malic, tartaric, citric, and the like. The amount of polybasic carboxylic acid, preferably citric acid, employed in the impregnating solution is determined by the weight of the carrier material impregnated. The amount is suitably in the range of from about 0.05 to about 0.75 wt. % of said carrier material.

As heretofore mentioned, it has been observed that although the inclusion of a polybasic carboxylic acid in the impregnating solution is effective to deposit a catalytic component embedded as a subsurface layer a finite distance from the exterior surface of a support or carrier material, a significant amount of the frequently expensive catalytic component will invariably migrate and penetrate beyond the desired subsurface layer during the impregnation process. While U.S. Pat. No. 3,367,888 describes the use of a sulfur-containing carboxylic acid to impregnate a catalytic component on the extreme outer surface of a support or carrier material, it has now been discovered that the subsequent and timely addition of said sulfur-containing carboxylic acid to the above-described impregnating solution in contact with the support or carrier material, as herein practiced, will effectively arrest the migration of the catalytic component and limit its penetration beyond the desired subsurface layer during the impregnation process.

Accordingly, pursuant to the method of this invention, the support or carrier material is maintained in the polybasic carboxylic acid-containing impregnating solution for a period of from about 2 to about 10 minutes after which a sulfur-containing carboxylic acid is added thereto. The sulfur-containing carboxylic acid is substantially as desired in U.S. Pat. No. 3,367,888, that is, preferably a thio or mercapto carboxylic acid such as, for example, thiomalic acid, thioglycolic acid, mercaptopropionic acid, and the like. The sulfur-containing carboxylic acid is suitably employed in from about a 1:1 to about a 3:1 mole ratio with the aforesaid Group VIII metal component.

The method of this invention can be effected utilizing impregnating techniques known to the art. Thus, a particulate carrier material can be immersed in a common aqueous solution of chloroplatinic acid and chloropalladic acid or palladium chloride, said solution further containing a selected polybasic carboxylic acid, preferably citric acid, in the requisite amount. The selected sulfur-containing carboxylic acid, preferably thiomalic acid or thioglycolic acid, is added to the solution within from about 2 to about 10 minutes of the carrier material and, after a brief period of from about 2 to about 30 minutes, the solution may be decanted, drained or evaporated from said carrier material. For example, a given volume of 1/16–⅛ inch alumina spheres is immersed in a substantially equal volume of an impregnating solution in a steam-jacketed rotary dryer — the impregnating solution comprising chloroplatinic acid, chloropalladic acid and a requisite quantity of citric acid. The spheres are tumbled in the impregnating solution for a period of from about 2 to about 10 minutes after which thiomalic acid is added thereto. Steam is subsequently applied to the dryer jacket to expedite evaporation of the solution and recovery of substantially dry impregnated alumina spheres.

There are a number of factors which effect the activity, activity stability and physical stability of a catalytic composite, and the factors are generally peculiar to the environment in which the catalytic composite functions. For example, the automotive internal combustion engine is commonly operated over a wide range of speed and load conditions including idling, cruising, accelerating and decelerating conditions, and the combustion efficiency varies accordingly. Consequently, the environment in which the catalytic composite must function will comprise not only variations in the concentration of pollutants at any given time, but also variations in temperature and space velocity at any given time. Thus, in the treatment of noxious exhaust gases from an internal combustion engine, the catalytic composite must function in an environment of changing gaseous hourly space velocities in the range of from about 10,000 to about 100,000 or more, and temperature variations of from about 95° to about 1100° C. or more, and must exhibit high activity and physical strength over an extended period equivalent to about 50,000 miles or more of automotive operation.

While the refractory inorganic oxides herein contemplated are generally useful as a catalyst support or carrier material and exceptionally resistant to physical degradation in a more conventional type of operation, they experience a shrinkage upon continued exposure to the extreme temperatures encountered in the treatment of exhaust gases from an internal combustion engine, and the ultimate effect is breakage and undue loss of catalyst. This is particularly true with respect to the more desirable low density gamma-alumina which, upon contained exposure to the extremely high temperatures involved, tends to assume a more thermally stable phase of lower surface area, for example theta-, and even alpha-alumina, as well as a high density through shrinkage.

The catalytic composite of this invention includes an alkaline earth metal component selected from the group consisting of calcium, strontium and barium to improve the activity and activity stability of the catalytic components, and especially the physical stability of the refractory inorganic oxide support or carrier material on which the physical stability of the catalytic composite depends. Of the alkaline earth metal components, barium is preferred. The optimum alkaline earth component is a function of the density of the refractory inorganic oxide employed as a support or carrier material. It will be appreciated that the refractory inorganic oxides of higher density suffer less shrinkage at higher temperatures than do these of lower density, and the optimum alkaline earth metal content will therefore increase in the range of from about 1 to about 20 wt. % with decreasing density.

A catalytic composite comprising a refractory inorganic oxide carrier material, a platinum group metal component and an alkaline earth metal component, and particularly adapted to the oxidation of noxious exhaust gases from an internal combustion engine, is disclosed in U.S. Pat. Nos. 3,388,077 and 3,409,390. The inclusion of an alkaline earth metal component, which may be calcium, strontium, and/or barium, is disclosed as useful to enhance the physical stability of the catalytic composite as well as the activity and activity stability thereof.

Subsequent associated work has revealed the order of impregnation to have a significant influence on catalyst activity. Thus, when the alkaline earth metal component is impregnated on the carrier material either prior to or simultaneously with the platinum group metal component, an inferior catalyst is obtained, most likely as a result of poor distribution of the platinum group metal component on the carrier material. On the other hand, when the platinum group metal component is impregnated on the carrier material prior to the alkaline earth metal component, an intermediate high temperature calcination is required to obviate leaching of the expensive platinum group metal component from the carrier material in the course of the subsequent alkaline earth metal impregnation operation. It will be appreciated that the required intermediate high temperature calcination is a substantial factor in determining the cost of this highly useful exhaust gas conversion catalyst.

It is therefore a further object of this invention to present a method of impregnating a porous refractory carrier material with a platinum group metal component and an alkaline earth metal component at conditions to obviate the need of an intermediate high temperature calcination.

Pursuant to the present invention, leaching of the platinum group metal component from the carrier material is substantially obviated by impregnating the platinum group metal-impregnated carrier material with a solution of an alkaline earth metal salt of an organic acid, and maintaining the solution in contact with the carrier material while it is evaporated to dryness. While the practice of evaporating the impregnating solution in contact with the carrier material obviates leaching of the platinum group metal component therefrom, practice precludes the use of certain alkaline earth metal compounds heretofore preferred. Thus, while an aqueous solution of an alkaline earth metal salt of a strong acid, and especially an aqueous solution of an alkaline earth metal oxide of hydroxide, has heretofore been a preferred impregnating solution, when said solutions are evaporated and concentrated in contact with the carrier material, the final catalyst product is comprised of an excessive amount of catalyst fines. However, when the platinum metal-impregnated carrier material is impregnated with a solution of an alkaline earth metal salt of an organic acid and the solution evaporated to dryness in contact with the carrier material pursuant to the present invention, the final catalyst product is recovered substantially free of catalyst fines. Suitable alkaline earth metal salts of an organic acid for use herein include the various water-soluble salts, and particularly those containing up to about 10 carbon atoms, for example, calcium formate, calcium acetate, calcium propionate, calcium butyrate, calcium isobutyrate, strontium formate, strontium acetate, barium formate, barium acetate, barium propionate, barium butyrate, and the like.

The dried platinum group metal-impregnated carrier material is conveniently further impregnated with the alkaline earth metal salt solution utilizing the aforementioned steam-jacketed rotary evaporator. Thus, a volume of the alkaline earth metal salt solution, for example an aqueous barium acetate solution, is added to a substantially equal volume of the impregnated carrier material contained in said steam-jacketed rotary dryer evaporator. Again, the impregnated carrier material is advantageously tumbled in the solution for a period of about 30 minutes at ambient temperature after which steam is applied to the dryer jacket to expedite the evaporation process. The resulting dried composite is subsequently calcined in air at a temperature of from about 200° to about 1000°C. or more.

The following example is presented in illustration of the method of this invention and is not intended as an undue limitation on the generally broad scope of the invention as set out in the appended claims.

EXAMPLE

In the preparation of a catalyst in accordance with the method of the invention, 200 grams of ⅛inch gamma-alumina spheres having an average bulk density of about 0.3 grams per cubic centimeter and a surface area of about 180 square meters per gram were immersed in a 600 milliliter aqueous chloroplatinic acid solution contained in a steam-jacketed rotary dryer. The impregnating solution contained 0.150 grams of citric acid and the equivalent of 0.25 grams of platinum. The spheres are tumbled in the solution for about 8 minutes after which 0.20 grams of thiomalic acid was added thereto. The residual solution was drained after an additional tumbling period of 15 minutes. Thereafter, 600 milliliters of an aqueous barium acetate solution containing 16.0 grams of barium was added to the spheres contained in the rotary dryer. The spheres were further tumbled in the solution for 30 minutes at room temperature and the solution then evaporated to dryness in contact with the tumbling spheres. The spheres were subsequently calcined in a stream of air for 1 hour at 315° C. and then for 2 hours at 535° C. to yield a catalytic composite containing .11 wt. % platinum and 8.0 wt. % barium. This example illustrates that the method of this invention obviates leaching of the platinum component from the alumina carrier material during the barium impregnation step without resorting to an intermediate calcination step.

I claim as my invention:

1. A method of manufacturing a catalytic composite which comprises:
   a. commingling a refractory inorganic oxide carrier material with an impregnating solution containing a Group VIII metal component and from about 0.05 to about 0.75 wt. % polybasic carboxylic acid, said polybasic carboxylic acid effecting subsurface impregnation of said Group VIII metal component;
   b. maintaining carrier material in said solution for a period of time of from about 2 to about 10 minutes, thereafter commingling sufficient sulfur-containing carboxylic acid with said solution to provide from about 1 to about 3 mols of said acid per mole of said Group VIII metal, and effecting the deposition of said Group VIII metal component concentrated in a thin surface layer on said carrier material, said sulfur-containing carboxylic acid inhibiting substantial straying of said Group VIII metal from said subsurface layer;
   c. prior to calcining impregnated carrier material, further impregnating the same with a solution of an alkaline earth metal salt of an organic acid selected from the group consisting of the calcium, strontium and barium salts thereof, and evaporating said solution to dryness in contact with the impregnated carrier material; and
   d. thereafter calcining the impregnated carrier material in an oxidizing atmosphere at a temperature of from about 200° to about 1000°C. or more.

2. The method of claim 1 further characterized in that said polybasic carboxylic acid is a dibasic carboxylic acid.

3. The method of claim 1 further characterized in that said polybasic carboxylic acid is citric acid.

4. The method of claim 1 further characterized in that said sulfur-containing carboxylic acid is thiomalic acid.

5. The method of claim 1 further characterized in that said sulfur-containing carboxylic acid is thioglycolic acid.

6. The method of claim 1 further characterized in that said Group VIII metal component is a noble metal component.

7. The method of claim 1 further characterized in that said Group VIII metal component is a platinum component.

8. The method of claim 1 further characterized in that said Group VIII metal component is a platinum component in combination with a palladium component.

9. The method of claim 1 further characterized in that said Group VIII metal component comprises palladium in combination with platinum in a weight ratio of from about 9:1 to about 1:4, in an amount to yield a final catalytic composite containing from about 0.0025 to about 2.0 wt. % of the palladium-platinum combination.

10. The method of claim 1 further characterized in that said refractory inorganic oxide carrier material is a low density, spheroidal alumina with a surface area of from about 25 to about 600 square meters per gram.

11. The method of claim 1 further characterized with respect to step (c) in that said alkaline earth metal salt of an organic acid is utilized in an amount to provide a final product containing from about 8 to about 10 wt. % alkaline earth metal.

12. The method of claim 1 further characterized with respect to step (c) in that said alkaline earth metal salt is a barium salt of an organic acid.

13. The method claim 1 further characterize with respect to step (c) in that said alkaline earth metal salt is barium acetate.

* * * * *